(12) United States Patent
Shao et al.

(10) Patent No.: US 9,038,356 B2
(45) Date of Patent: May 26, 2015

(54) HANDLE MECHANISM WITH MULTIPLE STOP LOCATIONS AND A LAWN MOWER INCLUDING THE HANDLE MECHANISM

(71) Applicant: Chervon (HK) Limited, Wanchai (HK)

(72) Inventors: Xiandian Shao, Nanjing (CN); Toshinari Yamaoka, Nanjing (CN)

(73) Assignee: Chervon (HK) Limited (HK)

( * ) Notice: Subject to any disclaimer, the term of this patent is extended or adjusted under 35 U.S.C. 154(b) by 150 days.

(21) Appl. No.: 13/772,814

(22) Filed: Feb. 21, 2013

(65) Prior Publication Data

US 2013/0212996 A1 Aug. 22, 2013

(30) Foreign Application Priority Data

Feb. 22, 2012 (CN) .......................... 2012 1 0040240

(51) Int. Cl.
*A01D 34/00* (2006.01)
*A01D 34/82* (2006.01)
*B25G 3/38* (2006.01)

(52) U.S. Cl.
CPC ................ *A01D 34/824* (2013.01); *B25G 3/38* (2013.01)

(58) Field of Classification Search
USPC .............. 56/16.7, 17.5; D15/14; 16/437, 441; 29/525.02; 280/655.1, 47.36, 47.371
See application file for complete search history.

(56) References Cited

U.S. PATENT DOCUMENTS

| | | | | |
|---|---|---|---|---|
| 2,617,670 A * | 11/1952 | Welsh | ............................. | 403/95 |
| 2,727,753 A * | 12/1955 | Johnson et al. | ............ | 280/655.1 |
| 2,763,492 A * | 9/1956 | Phelps | ........................ | 280/47.36 |
| 3,038,737 A * | 6/1962 | Lill | ............................. | 280/655.1 |
| 3,144,258 A * | 8/1964 | Ottosen et al. | ............. | 280/47.36 |
| 3,604,187 A * | 9/1971 | Weber | ............................. | 56/249 |
| 3,764,156 A * | 10/1973 | Nepper et al. | ............. | 280/47.36 |
| 4,108,456 A * | 8/1978 | Woelffer et al. | ......... | 280/47.371 |
| 4,561,239 A * | 12/1985 | Cook | ........................... | 56/320.1 |
| 5,261,215 A * | 11/1993 | Hartz et al. | .................... | 56/11.9 |
| 5,636,504 A * | 6/1997 | Kaley et al. | ......................... | 56/1 |
| 7,231,755 B2 * | 6/2007 | Clarke | ............................ | 56/14.7 |
| 8,713,761 B2 * | 5/2014 | Grewe et al. | .................... | 16/437 |
| 2004/0093840 A1 * | 5/2004 | Velke et al. | .................... | 56/15.8 |
| 2005/0188664 A1 * | 9/2005 | Clarke | ........................... | 56/14.7 |

* cited by examiner

*Primary Examiner* — Árpád Fábián-Kovács
(74) *Attorney, Agent, or Firm* — Greenberg Traurig, LLP

(57) ABSTRACT

A handle mechanism with multiple stop locations and a lawn mower including the handle mechanism includes a handle and a location shifting element with multiple stop locations, the handle being provided with a locking mechanism that is automatically clamped with one of the multiple of stop locations of the location shifting element for fixing or adjusting the handle. A lawn mower, including the handle mechanism, includes a lawn mower body, the handle rotatably connected with the lawn mower body by the handle rotating shaft. The locking mechanism and the location shifting element are equipped with stop locations can be automatically locked, therefore, the operator can adjust the stop locations of the lawn mower conveniently.

18 Claims, 4 Drawing Sheets

HANDLE MECHANISM WITH MULTIPLE STOP LOCATIONS AND A LAWN MOWER INCLUDING THE HANDLE MECHANISM

CROSS REFERENCE TO RELATED APPLICATION

This application is a non-provisional application claiming priority from Chinese Patent Application Serial No. 201210040240.5, filed Feb. 22, 2012, entitled "Lawn Mower" and incorporated herein by reference in its entirety.

FIELD OF THE DISCLOSURE

The present description relates generally to power tools and auxiliary mechanism thereof, and more particularly, to a handle mechanism with multiple stop locations and a lawn mower including the handle mechanism.

BACKGROUND OF RELATED ART

Lawn mowers are a common power tool. Consumers have typically demanded higher portability and mobility of the lawn mower. A lawn mower's handle can sometimes act in achieving an important role on improving the convenience of the lawn mower. For instance, the lawn mower can achieve various functions, such as grass-cutting, grass-pouring, and can be folded and stored with the handle at different stop locations.

Currently, some widely-used lawn mowers in the market suffer from at least some of the following problems. In particular, in these mowers, when the stop locations are adjusted, a stop pin needs to be removed first allowing the handle to be rotated to a predetermined stop location, wherein the stop pin must be reinserted into this stop location. However, this manual operation to adjust the stop locations is very inconvenient. Moreover, very large vibrations can oftentimes occur during the mower's operation, which may cause the stop pin to be incapable of reliably and stably stopping the handle at the desired stop location. Thus, the stop pin dropping off or jumping from the desire stop location may occur during operation. Currently, no known lawn mower can solve the above problems efficiently.

SUMMARY

In order to solve the known deficiencies in the prior art, one object of the present invention is to provide a handle mechanism with multiple stop locations and a lawn mower including the handle mechanism. The present handle mechanism enables the operator to adjust stop locations of the lawn mower easily and conveniently, therefore, improving the portability of the lawn mower. At the same time, the disclosed handle mechanism with multiple stop locations also makes for the accurate and reliable the retention of the locking device in the desired stop location.

To obtain the above object, the handle mechanism with multiple stop locations of the present invention employs the following technical solution: a handle mechanism with multiple stop locations, including a handle, wherein it further includes a location shifting element with several stop locations, wherein the handle is provided with a locking mechanism that is automatically clamped with one of the multiple stop locations of the location shifting element to fix or adjust the handle.

The invention also provides a lawn mower, including the disclosed handle mechanism with multiple stop locations and a lawn mower body, wherein the handle is rotatably connected with the lawn mower body by the handle rotating shaft.

The benefits of the present invention are at least as follows: in the handle mechanism with multiple stop locations and the lawn mower including the handle mechanism, the locking mechanism and the location shifting element equipped with stop locations have the function to automatically lock. Therefore, the operator can adjust the stop locations of the lawn mower more easily. Moreover, the locking of the adjustment mechanism at a desired stop location is accurate and reliable, which largely improves portability, flexibility, and reliability of use.

DETAILED DESCRIPTION

Next, the present invention will be further described with reference to the drawings and specific embodiments.

Figure 1:
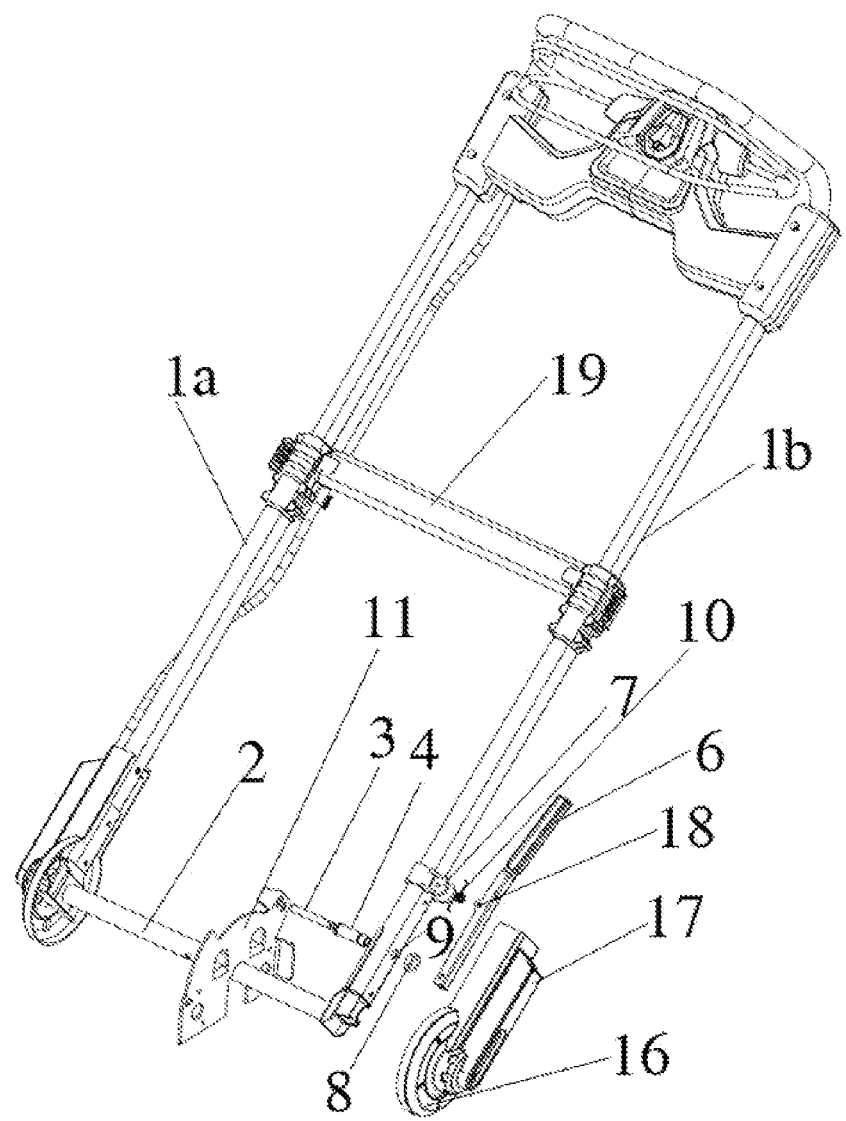
FIG. 1 is a structural schematic view of a handle mechanism with multiple stop locations according to a preferred embodiment of the present invention.
Figure 2:
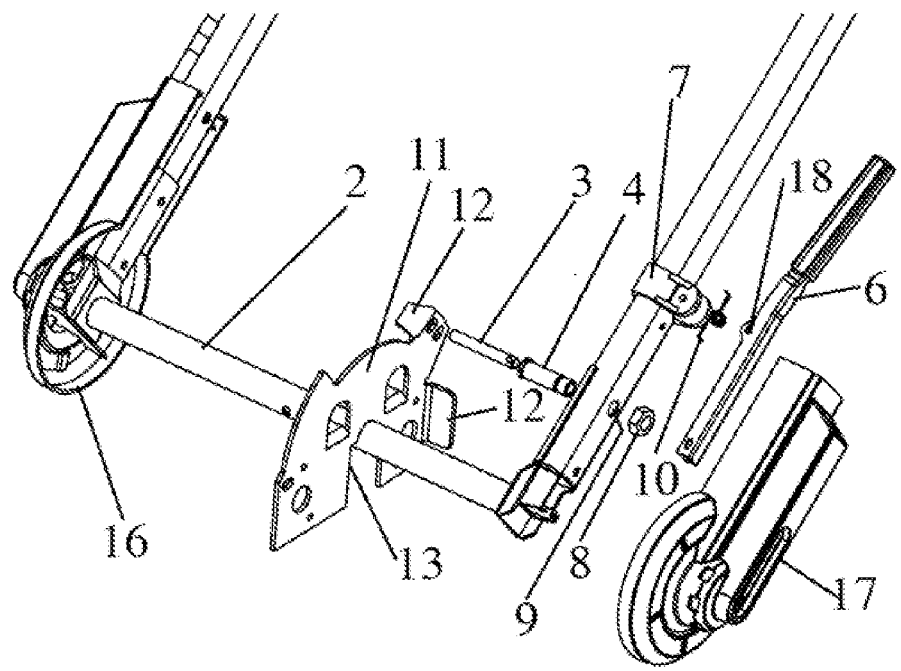
FIG. 2 is a partial enlarged structural schematic view of the preferred embodiment as shown in FIG. 1.
Figure 3:
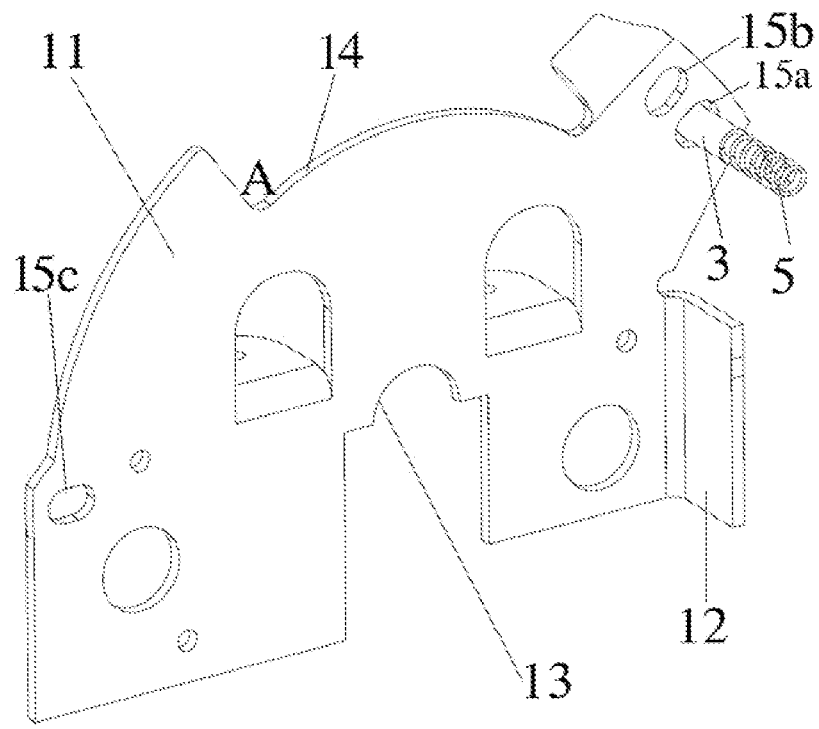
FIG. 3 is a structural schematic view of the preferred embodiment as shown in FIG. 1, in which a location-shifting element is embodied as a location-shifting lock plate.

Referring to FIGS. 1-3, the handle mechanism with multiple stop locations comprises a handle, a location shifting element, and a locking mechanism. Particularly, the location shifting element is used for providing multiple stop locations of the handle mechanism, and the locking mechanism is used for automatically clamping with one of the multiple stop locations of the location shifting element to fix or adjust stop locations. Every component of the handle mechanism with multiple stop positions is described in details as follows.

As a preferred embodiment, the handle includes two connecting rods 1a, 1b, and a handle rotating shaft 2, wherein the handle rotating shaft 2 is connected to the ends of two connecting rods 1a, 1b at the same one side to make the two connecting rods 1a, 1b movable simultaneously as a whole. The ends of the two connecting rods at the other side are provided with a grasp structure to be conveniently grasped by the hand. Given that the own length of the connecting rods 1a, 1b may be long, a fixing rod 19 can also be arranged at the intermediate position thereof for connecting the two connecting rods 1a, 1b so as to increase reliability and firmness of the handle.

As mentioned before, the location shifting element is used for providing stop locations and cooperating with the locking mechanism to lock the stop location. As a preferred embodiment, the location shifting element is a plate-shaped location-shifting locking plate 11. It will be appreciated that the location shifting element can be other shapes as desired, such as block-shaped. In addition, a mounting notch 13 is further defined in the bottom of the location-shifting locking plate 11, which enables the handle rotating shaft 2 not to be obstructed during shifting stop location by rotating the rotating shaft. It should be noted that, the stop locations are preferably multiple stop holes or an arc-shaped stop notch 14 formed on the location-shifting locking plate 11, and the stop holes are positioned both sides of the stop notch 14.

In order to adjust and fix the stop location better and flexibly, the example locking mechanism includes a location shifting assembly for adjusting stop locations and an operation assembly for controlling the above location shifting assembly.

Specifically, the location shifting assembly includes an automatically retractable pin 3, a pin bushing 4, and a spring member 5. More specifically, the automatically retractable pin 3 can be engaged with one of the stop holes and the stop notch 14 to achieve a locking at a specific stop location, the pin bushing 4 is fixedly connected to the connecting rod 1b, and surrounds the automatically retractable pin 3 in such a way that the pin bushing 4 can move slidably with respect to the automatically retractable pin 3, the automatically retractable pin 3 can be ejected toward the stop location of the location-shifting locking plate 11 by the spring member 5 to achieve an automatically locking of the stop location without action of any external force.

As a preferred embodiment, the pin bushing 4 is provided with external threads at the end fixedly connected to the connecting rod 1b, a through hole 9 is formed in the connecting rod 1b at the position where the pin bushing 4 is connected to the connecting rod 1b, and internal threads are formed within the through hole 9 to be mated with the external threads on the pin bushing 4, as a result, the pin bushing 4 and the connecting rod 1b are fixedly connected together. It will be understood that other methods can be used. For example, the pin bushing 4 is fixedly connected with the connecting rod 1b by the portion of the pin bushing 4 with the external threads passing through the connecting rod 1b and being fixedly connected with the nut 8.

For mating the automatically retractable pin 3 with one of the stop locations, a pin-stop structure is formed on the automatically retractable pin 3, a bushing-stop structure is formed on the pin bushing 4, and the spring member 5 is arranged between the pin-stop structure and the bushing-stop structure. Preferably, the spring member 5 is a helical spring, and the pin-stop structure is an annular step formed on the periphery of the automatically retractable pin 3, and the bushing-stop structure is an annular step formed within the pin bushing 4. In this way, one end of the helical spring leans against the pin-stop structure and the other end thereof leans against the bushing-stop structure, such that the automatically retractable pin 3 has a tendency to move toward the location shifting element so as to achieve an automatic locking of the stop location.

For changing the stop locations, the automatically retractable pin 3 needs to be ejected out from the current stop location and moved. Therefore, an operation assembly for driving the automatically retractable pin 3 is necessary.

The operation assembly includes an operation element 6 and a fixing element 7. Specifically, the operation element 6 is an implementing part for adjusting the stop locations by the operator, which is equipped with an anti-sliding handle at the end to be grasped by hand so that the operation element 6 can be controlled more reliably by the operator. The automatically retractable pin 3 passes through the pin bushing 4 and the connecting rod 1b to be rotatably connected with the other end of the operation element 6. Preferably, an axle hole is defined at the position where the automatically retractable pin 3 is connected with the operation element 6, in which an axle (not shown) is inserted such that the automatically retractable pin 3 is rotatably connected with the operation element 6.

The fixing element 7 is fixedly connected to the connecting rod 1b having a through hole 9, and the operation element 6 is rotatably connected with the fixing element 7. In order to establish a rotatable connection between the operation element 6 and the fixing element 7, as a preferred embodiment, connecting axle holes 18 are formed in the fixing element 7 and the operation element 6 respectively, in which a rotating shaft (not shown) is inserted during installation. The rotatable connection formed in this way is not only secure and reliable, but also simple in structure and convenient for installation. In this way, the operation element 6 serves as a lever with a fulcrum located at the position where the operation element 6 is connected with the fixing element 7. When the anti-sliding handle of the operation element is impelled to move toward the connecting rod 1b under an external force, the automatically retractable pin 3 will be moved away from the location-shifting element and then is ejected out of the current stop location so as to be prepared for the adjustment of the stop locations under the action of the operation element 6.

In order to further improve portability of use, the operation assembly further comprises a restoring element 10 which can be automatically restored without external force. Preferably, the restoring element 10 is a torsional spring encircling the rotating shaft with one end abutting against the operation element 6 and the other end abutting against the fixing element 7 or the connecting rod 1b fixedly connected with the fixing element 7. Therefore, the spring energy of the torsional spring will impel the operation element 6 to automatically return in the case of absence of the action of external force. It will be appreciated that that the restoring element 10 can also be designed based on magnetic energy, as is well known to one of ordinary skill in the art.

By the above description, the handle mechanism with multiply stop locations able to portably and reliably implement the automatic location shifting is introduced. FIGS. 4-7 illustrate schematic views of the lawn mower including the handle mechanism at various stop locations.

The lawn mower comprises a lawn mower body, which is rotatably connected with the handle by the handle rotating shaft 2, and the location shifting element 11 is mounted to the lawn mower body. The fixing and adjustment to the stop locations of the lawn mower can be achieved by the relative rotation between the handle and the lawn mower body. For convenient use and transportation, more than one travel wheels 16 are arranged on the lawn mower body, and the axial direction of the handle rotating shaft 2 is parallel to the axle direction of the travel wheels 16. At the same time, a protective cover 17 is mounted on the outer side of the connecting rod 1b mounted with the pin bushing 4, which ensures the protection to the handle mechanism with multiply stop locations and the lawn mower and makes the appearance thereof more beautiful and compact.

To make the fixing between the location-shifting locking plate 11 and the lawn mower body more secure, the location-shifting locking plate 11 is bent and extending toward the direction parallel to the handle rotating shaft 2 to form a stop structure 12. Accordingly, the lawn mower body is equipped with an installation structure (not shown) for mating with the stop structure 12. The installation structure can be, but not limited to, a groove that is integrally formed with the lawn mower body and can receive the stop structure 12. In this way, the location-shifting locking plate 11 is fastened to the lawn mower body by screws, and the cooperation of the stop structure 12 and the installation structure can effectively prevent the both from moving therebetween, which ensures the assembly and the position stopping of the both are very reliable.

As a preferred embodiment, the stop locations are defined by stop holes and a stop notch 14, wherein the number of stop holes is three, two of which are adjacently arranged on the same side of the stop notch 14 and serve as a first-height stop location 15a and a second-height stop location 15b for adjusting the handle height during normal operation to meet demands from the people of different heights respectively, and the other of which 15c is arranged on the other side of the stop notch 14 and serves as a foldable stop location where the folded handle is folded when the lawn mower is stored, wherein the stop notch 14 is a movable stop location with an arc-shaped end to allow for the movement of the automatically retractable pin 3 when grasses are poured.

The location shifting course of the lawn mower including the handle mechanism is briefly described as follows.

1. Stop Location for Grass-Cutting

Figure 4:
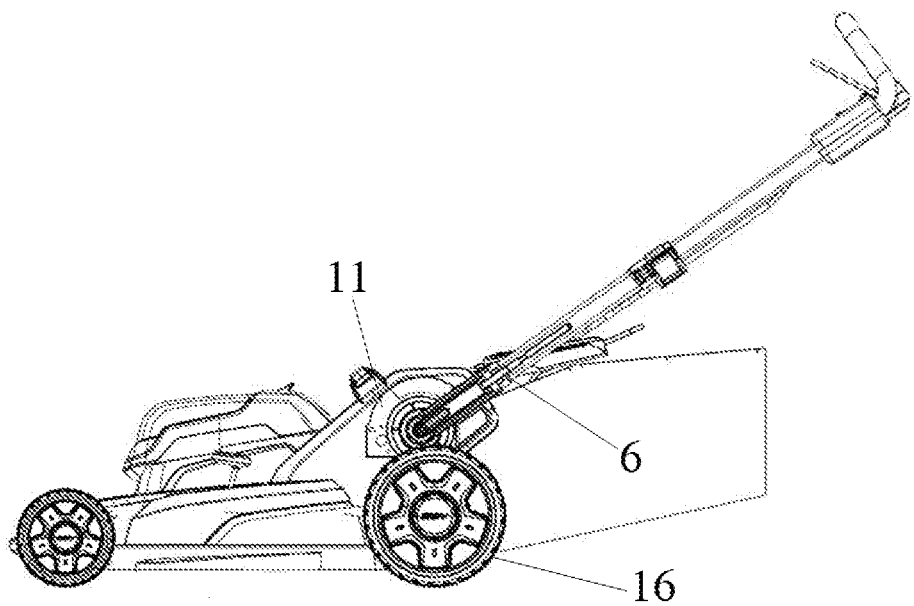
FIG. 4 is a schematic view of a lawn mower according to a preferred embodiment of the present invention, wherein the lawn mower is at a first height stop location.
Figure 5:
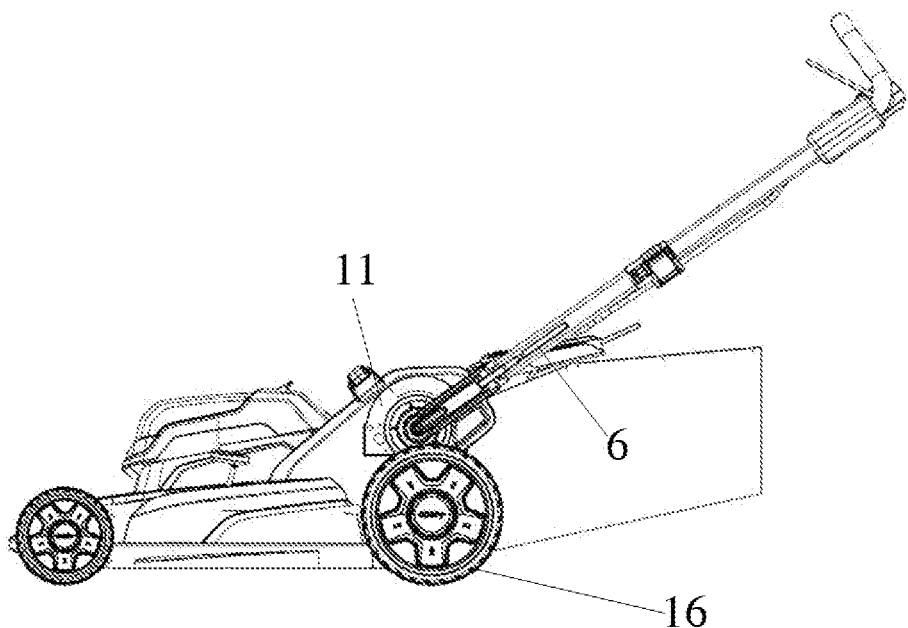
FIG. 5 is a schematic view of the lawn mower according to the preferred embodiment as shown in FIG. 4 at a second height stop location.

FIG. 3 illustrates a schematic view of the automatically retractable pin 3 being locked at the first-height stop location 15a, at this time, the state of the lawn mower is illustrated as shown in FIG. 4. When the stop locations are changed, the automatically retractable pin 3 is ejected from the first-height stop location 15a for grass-cutting under action of the operation assembly, then driven by the handle to rotate to the second-height stop location 15b, and subsequently automatically mated with the second height stop location 15b under the action of the spring member 5 in the case of absenting the external force. Accordingly, the stop locations at different height for grass-cutting can be adjusted conveniently to adapt customers of different heights.

2. Movable Stop Location

Figure 6:
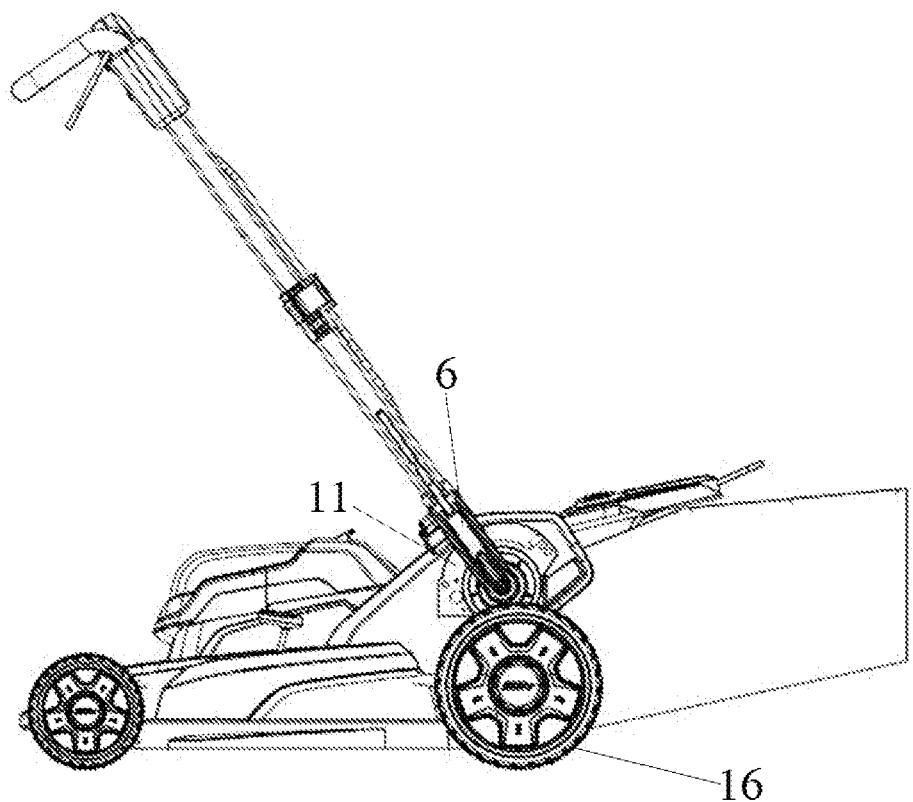
FIG. 6 is a schematic view of the lawn mower according to the preferred embodiment as shown in FIG. 4 at a movable stop location.

FIG. 6 illustrates the lawn mower being at the movable stop location, i.e. the schematic view of the stop location for grass-pouring. The automatically retractable pin 3 can be moved in the arc-shaped stop notch 14, and serve as a fulcrum for grass-cutting when reach the largest displacement (i.e. the point A shown in FIG. 3), which is convenient for grass-pouring.

3. Receiving Stop Location

Figure 7:
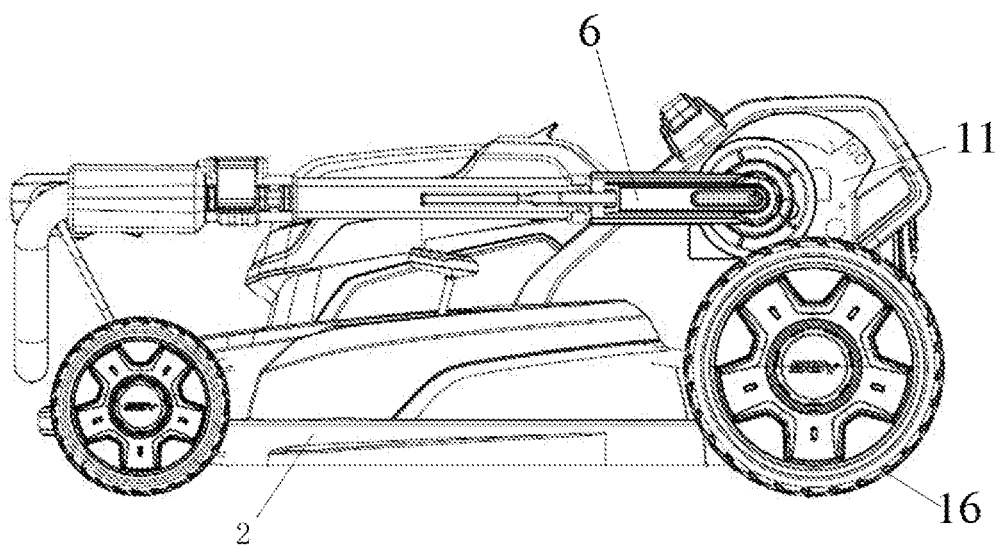
FIG. 7 is a schematic view of the lawn mower according to the preferred embodiment as shown in FIG. 4 at a foldable stop location.

The lawn mower can be folded as the state as shown in FIG. 7 for easy receiving when it is unused. At the same time, as a preferred embodiment, the handle can be a retractable handle for decrease the needed space to receive it.

The present invention is not limited by the above embodiments in any way, and many modifications and transformations also can be carried out without departing from the technical principal of the present invention, which are also considered as pouring within the protection scope of the present invention.

DESIGNATIONS OF REFERENCE SIGNS IN THE FIGURES

1a: connecting rod.
1b: connecting rod.
2: handle rotating shaft.
3: automatically retractable pin.
4: pin bushing.
5: spring member.
6: operation element.
7: fixing element.
8: nut.
9: through hole.
10: restoring member.
11: location-shifting locking plate.
12: stop structure.
13: mounting notch.
14: stop notch.
15a: first-height stop location.
15b: second-height stop location.
15c: foldable stop location.
16: travel wheel.
17: protective cover.
18: connecting axle hole.
19: fixing rod.

We claim:

1. A handle mechanism with multiple stop locations for a lawn mower, comprising:
a handle rotatably coupled to the lawn mower, the handle comprising a first connecting rod and a second connecting rod, a handle rotating shaft with two ends thereof being fixedly connected with ends of the first and second connecting rods, respectively, and other ends of the first and second connecting rods being located at a same side of the handle rotating shaft;
a location shifting element with a plurality of stop locations; and
a locking mechanism that is automatically clamped with one of the plurality of stop locations of the location shifting element to fix the handle, the locking mechanism comprising:
a location shifting assembly for changing the location of the locking mechanism relative to the plurality of stop locations and an operation assembly for controlling the location shifting assembly, the location shifting assembly comprising an automatically retractable pin mated with one of the plurality of stop locations of the location shifting element, and a spring member for ejecting the automatically retractable pin out of the stop location toward the direction of the location shifting element; and
an operation assembly comprising an operation element having a first end for operating by the operator and a second end opposite to the first end connected to the automatically retractable pin, and a fixing element fixedly connected to the first connecting rod, and the operation element being rotatably connected with the fixing element, when the first end of the operation element being impelled to move toward the first connecting rod under an external force, the second end of the operation element driving the automatically retractable pin to move away from the location shifting element and being ejected out of the stop location.

2. The handle mechanism with multiple stop locations according to claim 1, wherein the location shifting assembly comprises a pin bushing covering on the periphery of the automatically retractable pin to constitute a slidable connection therebetween, the pin bushing being fixedly connected with the first connecting rod, and one end of the automatically retractable pin away from the location shifting element passing through the pin bushing to be connected with the second end of the operation element.

3. The handle mechanism according to claim 2, wherein the pin bushing is provided with external threads on the end away from the location shifting element, the first connecting rod fixedly connected with the pin bushing is provided with a through hole through which the pin bushing passes, and the through hole is provided with internal threads for engaging with the external threads on the one end of the location shifting element.

4. The handle mechanism with multiple stop locations according to claim 3, wherein a nut is provided, away from the location shifting element, at the outside of the through hole, which is used for engaging with the end of the pin bushing with the external threads.

5. The handle mechanism with multiple stop locations according to claim 3, wherein the operation element further comprises a restoring element for enabling the operation element to be automatically restored when there is no external force.

6. The handle mechanism with multiple stop locations according to claim 5, wherein the fixing element and the operation element are provided with a connecting axle hole respectively, and constitute a rotatable connection by the rotating shaft arranged in the connecting axle holes; the restoring element is a torsional spring encircling the rotating shaft with one end leaning against the operation element and the other end leaning against the fixing element or the first connecting rod fixedly connected with the fixing element.

7. The handle mechanism with multiple stop locations according to claim 2, wherein the automatically retractable pin is formed with a pin stop structure, the pin bushing is formed with a bushing-stop structure, and the spring member is arranged on the periphery of the automatically retractable pin, within the pin bushing and between the pin stop structure and the bushing-stop structure.

8. The handle mechanism with multiple stop locations according to claim 7, wherein the spring member is a spiral spring with two ends leaning against the pin-stop structure and the bushing stop structure, respectively, the pin stop structure is an annular step formed on the periphery of the automatically retractable pin, and the bushing stop structure is an annular step formed within the interior of the pin bushing.

9. The handle mechanism with multiple stop locations according to claim 2, wherein the automatically retractable pin is rotatably connected with the second end of the operation element.

10. The handle mechanism with multiple stop locations according to claim 1, wherein the location shifting element is a locking plate.

11. The handle mechanism with multiple stop locations according to claim 10, wherein the locking plate is provided with a mounting notch for allowing for rotation of the handle rotating shaft when the locking plate is clamped with the periphery of the handle rotating shaft.

12. The handle mechanism with multiple stop locations according to claim 10, wherein stop holes and an arc-shaped stop notch are formed in the locking plate, the stop holes are located on both sides of the stop notch, and the locking plate is bent and extending parallel to the handle rotating shaft so as to form a stop structure.

13. The lawn mower according to claim 1, wherein the lawn mower body is provided with more than one travel wheels and the handle rotating shaft is parallel to the axial direction of the travel wheels.

14. The lawn mower according to claim 10, wherein the locking plate is provided with a mounting notch for allowing for the rotation of the handle rotating shaft when the locking plate is clamped with the periphery of the handle rotating shaft.

15. The lawn mower according to claim 14, wherein the locking plate is fixed on the outside of the lawn mower body, and a protective cover is mounted on the outside of the ends of the first and second connecting rods, stop holes and an arc-shaped stop notch are formed in the locking plate, and the stop holes are located on both sides of the stop notch.

16. The lawn mower according to claim 15, wherein the number of the stop holes is three, two of which are adjacently arranged on the same side of the stop notch and are used at a first-height stop location and a second-height stop location for adjusting the handle height during normal operation, respectively, and the other one of which is arranged on the other side of the stop notch and used at a foldable stop location where the handle is folded when the lawn mower is stored; wherein the stop notch is used at a movable stop location where the lawn mower is allowed to move the handle in a certain extent when grasses are poured.

17. The lawn mower according to claim 16, wherein the handle is a retractable handle.

18. The lawn mower according to claim 10, wherein the locking plate is bent and extending parallel to the handle rotating shaft to form a stop structure, and the lawn mower body is correspondingly provided with an installation structure for mating with the stop structure.

\* \* \* \* \*